United States Patent [19]
Van Lake

[11] 3,863,754
[45] Feb. 4, 1975

[54] FLAT WIRE CONVEYOR BELT WITH IMPROVED COVERING

[75] Inventor: Carmen J. Van Lake, Waukegan, Ill.

[73] Assignee: United States Steel Corporation, Pittsburgh, Pa.

[22] Filed: Oct. 24, 1972

[21] Appl. No.: 299,989

[52] U.S. Cl. .............................................. 198/195
[51] Int. Cl. .......................................... B65g 17/06
[58] Field of Search ........................... 198/195, 194

[56] References Cited
UNITED STATES PATENTS

| | | | |
|---|---|---|---|
| 1,724,908 | 8/1929 | Comstock | 198/195 |
| 2,147,055 | 2/1939 | Perkins | 198/195 |
| 2,231,114 | 2/1941 | Ferry | 198/195 |
| 3,045,809 | 7/1962 | Bechtel | 198/195 |

Primary Examiner—Evon C. Blunk
Assistant Examiner—Jeffrey V. Nase
Attorney, Agent, or Firm—Rea C. Helm

[57] ABSTRACT

A flat wire conveyor belt has a flat cover plate fastened to each alternate link which is higher than the remaining links. The transverse edges of each cover plate extend downwards towards the lower link.

2 Claims, 2 Drawing Figures

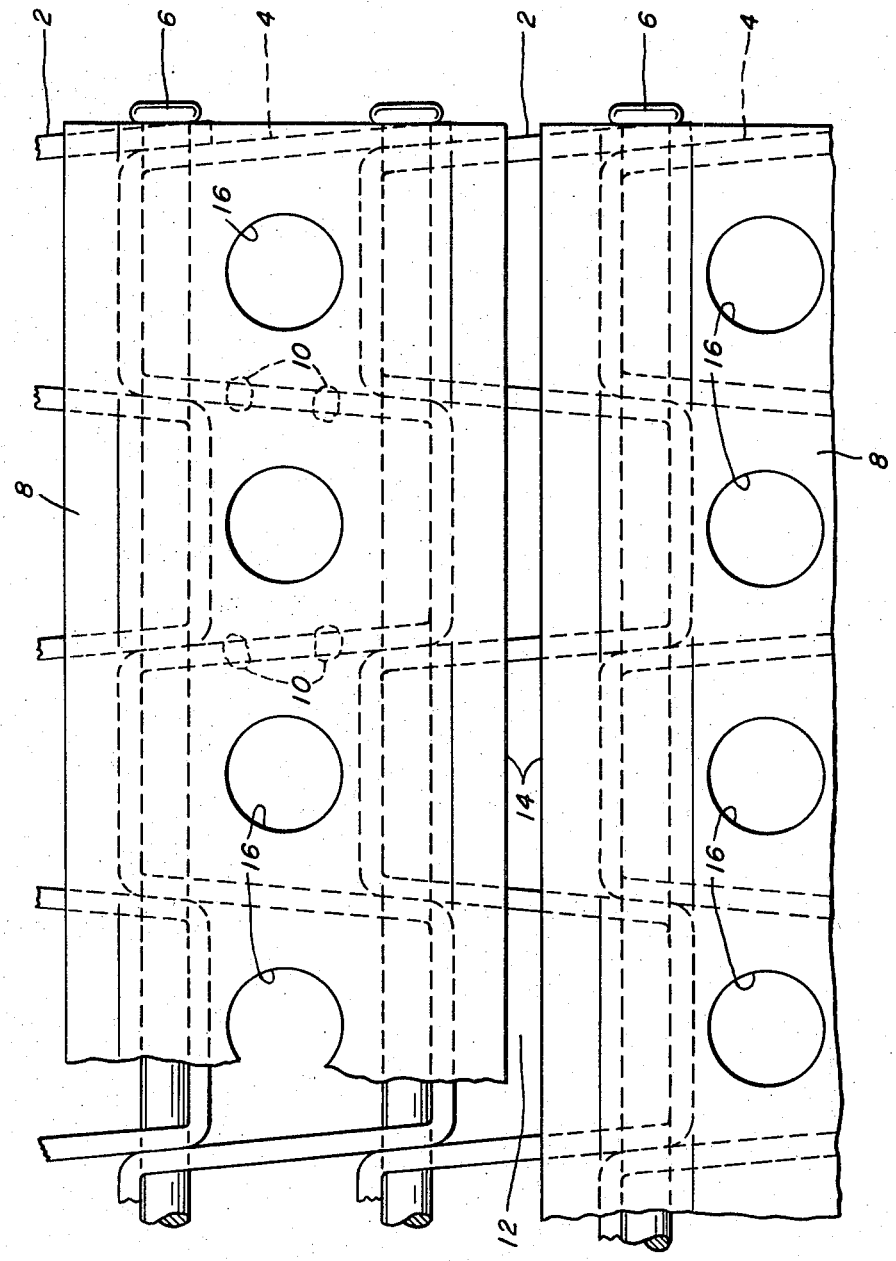

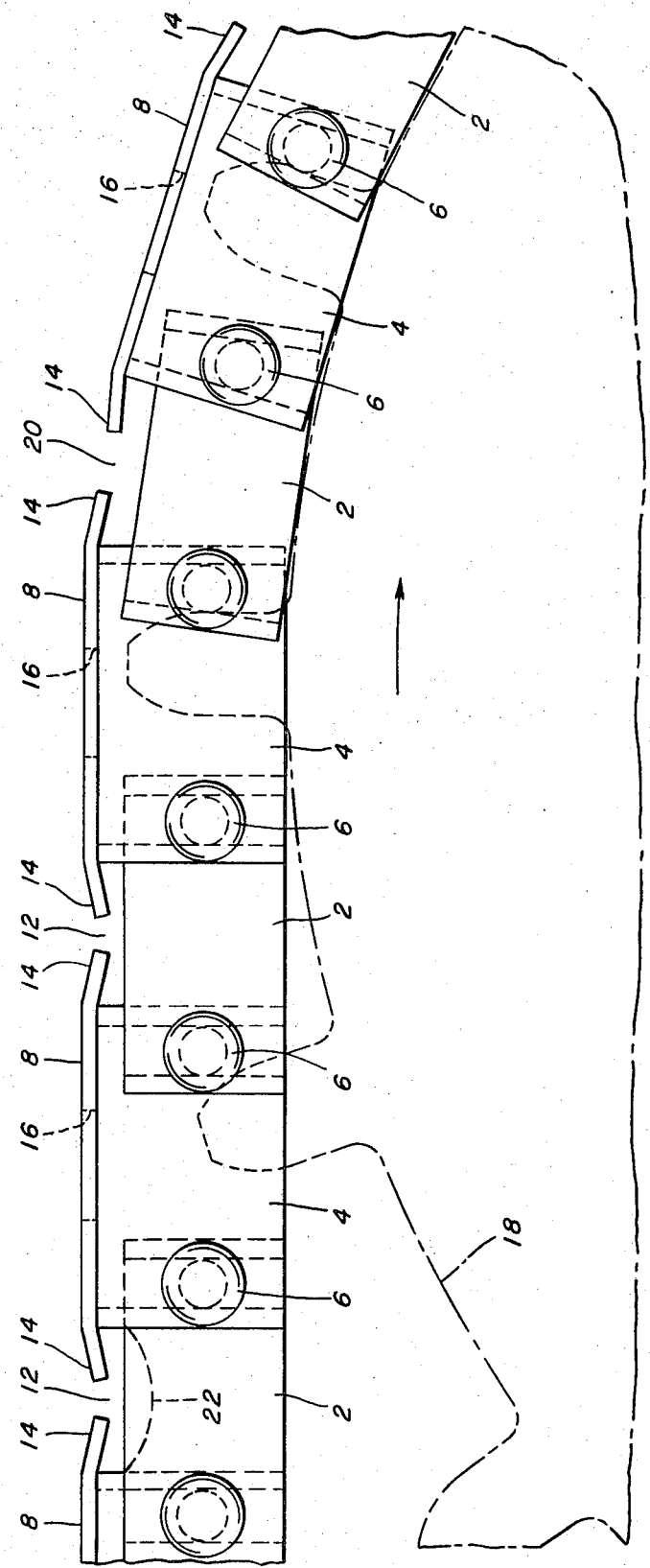

FLAT WIRE CONVEYOR BELT WITH IMPROVED COVERING

This invention relates to flat wire conveyor belts and more particularly to flat wire conveyor belts having cover plates which provide a maximum of deck area and at the same time provide a surface free of protruding or raised edges.

The handling of certain types of materials on flat conveyor belts, such as glassware, small diameter objects or delicate aluminum can bodies with blunt edges, requires a smooth surface without any transverse or longitudinal surfaces, projections or edges which may catch the materials. The conveying of such commodities requires the belt to be travelling during depalletizing and while the product is being held back for unscrambling into single lines without hangup or tipping. Conveyor belt cover plates that I am aware of, such as shown in Harter U.S. Pat. No. 1,354,553 and Harter U.S. Pat. No. 2,621,779 are not satisfactory because they do not prevent hangup on the edges of the cover plates or denting of delicate can cylinders which have no bottoms or tops. In addition, these belt structures do not provide sufficient flexibility to permit the belt to travel around sprockets and allow for the inherent sag of the belt without causing any binding within the belt structure.

It is therefore an object of my invention to provide a cover plate for a flat wire conveyor belt having a smooth surface and no protruding edges.

Another object of my invention is to provide a flat wire conveyor belt cover that is adaptable for sorting or holding delicate objects without damage while the belt is in motion.

These and other objects will become more apparent after referring to the following drawings and specification in which:

FIG. 1 is a fragmentary plan view of a conveyor belt having the cover plate of the preferred embodiment of my invention; and FIG. 2 is a fragmentary side elevation of the conveyor belt of the preferred embodiment of my invention shown partially wrapped around a sprocket.

Referring now to the drawings, reference numeral 2 is a flat wire connecting link of a conveyor belt having the cover plate of my invention. As shown in FIGS. 1 and 2, the connecting links 2 are connected to supporting links 4 by pintle rods 6, in an alternating arrangement. This is a conventional flat wire conveyor belt except that the supporting links 4 are made of wider flat wire than the connecting links 2. In the preferred embodiment the connecting links 2 are made of flat wire ⅜ inch wide and the supporting links 4 are made of flat wire 7/16 inch wide. Thus the height of links 2 in FIG. 2 is ⅜ inch and the height of links 4 in FIG. 2 is 7/16 inch. On top of each supporting link 4 is a cover plate 8. Cover plates 8 are fastened to supporting links 4 by any convenient method, such as spot weldings as shown at one loop of a link 4 at locations 10 in FIG. 1. The length of the cover plate 8 may be any desired or convenient length, as shown in FIG. 1, the right end of cover plate 8 terminates at the right end of the supporting link 4. The width of cover plate 8 should be sufficient so that the objects to be conveyed can bridge the gap between cover plates in the conveying position as at reference numeral 12. If the width of the links are equal, as shown, the width of the cover plate will be nearly twice as wide as a link. The transverse edges 14 of cover plate 8 are bent or rolled slightly downward as shown in FIG. 2 and may be performed in any convenient manner. Cover plates 8 may have perforations 16 for the purpose of air circulation as might be needed in glass lehr applications.

As the conveyor belt is moved, for example over a sprocket 18, the gap between cover plates 8 will change. Thus the gaps shown at 12 would be normal for conveying material but would be greater as at 20 where the belt no longer carries material and is wrapped around sprocket 18. If the belt sags, as for example, between sprockets, the gap 12 will be smaller because of the sag, and gap 12 may be made large enough to prevent contact between adjoining edges 14.

The downward deflected edges 14 permits the sweeping of articles off the conveyor while it is moving or the holding of articles in a stopped position for collecting purposes and at the same time prevents articles from catching on the edge of the cover plate. If the belt is used in only one direction, only the leading edge need be deflected downward.

While the conveyor has been shown with links of different heights, the same effect could be achieved by using links of the same height and providing a recess in the upper edge of the link as at 22 in FIG. 2 in connecting link 2 to receive edges 14 of the adjoining cover plates. The recess must not be so deep as to impair the strength of the link nor permit cover plates 8 to hit each other upon flexing of the belt. Where there is no problem with material handling in the vicinity of a sprocket, cover plates 8 need not be fastened to every other link, but may be made wide enough, for example, to cover every three or four links.

While I have shown and described several embodiments of my invention, it is apparent that other modifications may arise.

I claim:

1. In a conveyor belt having flat wire links joined together by pintle rods an improved covering providing for hindrance free transverse and longitudinal sliding movement of the objects to be conveyed while on the moving conveyor belt comprising
   a plurality of generally flat rectangular cover plates with each of said cover plates fastened to the top surface of an alternate link of the belt,
   said alternate links having a height greater than the links connecting the alternate links whereby openings are created below the top surface of the alternate links,
   said cover plates having the surface adjacent the transverse edges extending slightly downward into the adjacent opening and
   with each of said cover plates having straight continuous transverse edges with each edge nearly meeting the edge of the adjacent cover plate thereby providing a smooth surface for sliding objects over the face of the belt.

2. A conveyor belt according to claim 1 which includes perforations in said cover plate.

* * * * *